(12) United States Patent
Ellis et al.

(10) Patent No.: US 6,511,927 B1
(45) Date of Patent: Jan. 28, 2003

(54) BREATHABLE WATERPROOF LAMINATE AND METHOD FOR MAKING SAME

(75) Inventors: Laurence Fitch Ellis, Hampton, CT (US); Frank Christopher Montie, Warwick, RI (US)

(73) Assignee: Brookwood Companies, Inc., New York, NY (US)

( * ) Notice: Subject to any disclaimer, the term of this patent is extended or adjusted under 35 U.S.C. 154(b) by 0 days.

(21) Appl. No.: 09/392,121

(22) Filed: Sep. 8, 1999

Related U.S. Application Data

(60) Provisional application No. 60/099,446, filed on Sep. 8, 1998.

(51) Int. Cl.⁷ .................... B32B 5/18; B32B 27/04; B32B 27/12
(52) U.S. Cl. .................... 442/77; 442/76; 442/86; 442/394; 442/79
(58) Field of Search .................... 442/85, 79, 77, 442/394, 76, 86

(56) References Cited

U.S. PATENT DOCUMENTS

| | | | |
|---|---|---|---|
| 1,326,630 A | 12/1919 | Barker | |
| 2,263,544 A | 11/1941 | Rosenstein | |
| 3,953,566 A | 4/1976 | Gore | |
| 3,962,153 A | 6/1976 | Gore | |
| 3,989,870 A | 11/1976 | Bocks et al. | |
| 4,096,277 A | 6/1978 | Martin et al. | |
| 4,187,390 A | 2/1980 | Gore | |
| 4,194,041 A | * 3/1980 | Gore et al. | 428/315 |
| 4,258,100 A | 3/1981 | Fujitani et al. | |
| 4,344,999 A | 8/1982 | Gohlke | |
| 4,353,955 A | 10/1982 | Cook | |
| 4,433,026 A | 2/1984 | Molde | |
| 4,443,511 A | 4/1984 | Worden et al. | |
| 4,454,191 A | 6/1984 | von Blücher et al. | |
| 4,532,316 A | * 7/1985 | Henn | 528/59 |
| 4,539,255 A | 9/1985 | Sato et al. | |
| 4,547,423 A | 10/1985 | Kojima et al. | |
| 4,550,466 A | 11/1985 | Schmitz | |
| 4,561,435 A | 12/1985 | McKnight et al. | |
| 4,564,552 A | 1/1986 | Adiletta | |
| 4,613,544 A | 9/1986 | Burleigh | |
| 4,636,424 A | 1/1987 | Amemiya et al. | |

(List continued on next page.)

FOREIGN PATENT DOCUMENTS

| | | |
|---|---|---|
| DE | 27 37 756 | 3/1979 |
| DE | 3244-386 A | 12/1982 |
| EP | 0 081 850 A2 | 6/1983 |
| EP | 0 123 966 A2 | 11/1984 |
| EP | 0 184 392 A2 | 6/1986 |
| EP | 0 211 505 A2 | 2/1987 |
| EP | 0410291 A2 | 1/1991 |
| EP | 0657279 A1 | 6/1995 |
| GB | 703153 | 1/1954 |
| GB | 1085818 | 10/1967 |
| GB | 1 213 283 | 11/1970 |
| GB | 1 254 933 | 11/1971 |
| GB | 1 310 460 | 3/1973 |
| GB | 1 339 207 | 11/1973 |
| GB | 1405631 | 9/1975 |
| GB | 2 024 100 A | 1/1980 |
| GB | 2 131 678 A | 6/1984 |
| GB | 2 155 853 A | 10/1985 |

*Primary Examiner*—Cheryl A. Juska
*Assistant Examiner*—Christopher L. Pratt
(74) *Attorney, Agent, or Firm*—Alston & Bird LLP

(57) ABSTRACT

The present invention relates to waterproof fabric constructions, and more particularly to waterproof, breathable fabric constructions. The waterproof breathable fabric construction includes a microporous membrane layer and a nonporous layer. Cohesion is provided to the fabric construction through the use of both durable and breathable adhesives.

26 Claims, 2 Drawing Sheets

U.S. PATENT DOCUMENTS

| | | |
|---|---|---|
| 4,692,369 A | 9/1987 | Nomi |
| 4,731,283 A | 3/1988 | Sakane et al. |
| 4,761,324 A | 8/1988 | Rautenberg et al. |
| 4,816,328 A | 3/1989 | Saville et al. |
| 4,818,596 A | 4/1989 | Cook et al. |
| 4,833,026 A | 5/1989 | Kausch |
| 4,868,928 A | 9/1989 | Norvell |
| 4,925,732 A | 5/1990 | Driskill et al. |
| 4,943,475 A | 7/1990 | Baker et al. |
| 4,954,388 A | 9/1990 | Mallouk et al. |
| 4,961,985 A | 10/1990 | Henn et al. |
| 5,021,280 A | 6/1991 | Farnworth et al. |
| 5,026,591 A | 6/1991 | Henn et al. |
| 5,036,551 A | 8/1991 | Dailey et al. |
| 5,050,241 A | 9/1991 | Flowers et al. |
| 5,096,473 A | 3/1992 | Sassa et al. |
| 5,102,711 A | 4/1992 | Keller et al. |
| 5,104,727 A | 4/1992 | Wnenchak |
| 5,126,182 A | 6/1992 | Lumb et al. |
| 5,182,163 A | 1/1993 | Wheat et al. |
| 5,204,156 A | 4/1993 | Lumb et al. |
| 5,209,850 A | 5/1993 | Abayasekera et al. |
| 5,209,969 A | 5/1993 | Crowther |
| 5,242,747 A | 9/1993 | Wu |
| 5,264,276 A | 11/1993 | McGregor et al. |
| 5,268,212 A | 12/1993 | Lumb et al. |
| 5,277,954 A | 1/1994 | Carpenter et al. |
| 5,294,487 A | 3/1994 | Ohashi et al. |
| 5,306,536 A | 4/1994 | Moretz et al. |
| 5,308,689 A | 5/1994 | Shinkai et al. |
| 5,364,678 A | * 11/1994 | Lumb et al. ............... 428/96 |
| 5,391,426 A | 2/1995 | Wu |
| 5,418,054 A | 5/1995 | Sun |
| 5,468,537 A | 11/1995 | Brown et al. |
| 5,505,011 A | 4/1996 | Bleimhofer |
| 5,512,360 A | 4/1996 | King |
| 5,529,830 A | 6/1996 | Dutta et al. |
| 5,539,072 A | 7/1996 | Wu |
| 5,547,551 A | 8/1996 | Bahar et al. |
| 5,562,977 A | 10/1996 | Jager et al. |
| 5,593,754 A | 1/1997 | Blauer et al. |
| 5,599,610 A | 2/1997 | Levy |
| 5,636,382 A | 6/1997 | Chopko et al. |
| 5,650,225 A | 7/1997 | Dutta et al. |
| 5,660,918 A | 8/1997 | Dutta |
| 5,681,624 A | 10/1997 | Moriya |
| 5,681,645 A | 10/1997 | Strack et al. |
| 5,728,169 A | 3/1998 | Norvell |
| 5,750,444 A | 5/1998 | Jarrell et al. |
| 5,753,358 A | 5/1998 | Korleski |
| 5,766,750 A | 6/1998 | Korleski |
| 5,798,304 A | 8/1998 | Clarkson |
| 5,804,011 A | 9/1998 | Dutta et al. |
| 5,879,794 A | 3/1999 | Korleski, Jr. |
| 5,972,449 A | 10/1999 | Chung |
| 5,981,019 A | 11/1999 | Goodwin et al. |
| 6,034,033 A | 3/2000 | Aono et al. |
| 6,075,738 A | 6/2000 | von Fragstein et al. |
| 6,117,800 A | 9/2000 | Seibert et al. |
| 6,154,886 A | 12/2000 | Hottner |

* cited by examiner

BREATHABLE WATERPROOF LAMINATE AND METHOD FOR MAKING SAME

CROSS-REFERENCE TO RELATED APPLICATIONS

This application claims the benefit of U.S. Provisional Application Ser. No. 60/099,446, filed Sep. 8, 1998.

BACKGROUND OF THE INVENTION

1. Field of the Invention

The invention generally relates to a breathable, waterproof textile laminate. More specifically, the invention relates to textile laminates useful in the production of apparel, industrial, military, and medical products, and the like, which are resistant to contamination, thereby retaining breathability and waterproofness throughout use and numerous cleaning, laundering, or restoration cycles. The invention also relates to a method of producing such a laminate.

2. Description of the Prior Art

Breathable waterproof textile laminates are beneficial in a myriad of applications. For example, breathable waterproof textile laminates are useful in a range of apparel, industrial, medical, and military applications. More particularly, breathable waterproof textile laminates are useful in articles of apparel such as uniforms, workwear, outerwear, active wear, and protective clothing. Beneficial industrial applications include uses such as filtration. Medical applications for breathable waterproof laminates include uses such as surgical drapes and cast linings. Military applications include use in tents, tarps, and such. Other applications for such laminates include but are not limited to use in mattress pads and animal protective wear.

Breathable waterproof laminates are particularly advantageous in traditional textile fabric applications, such as apparel. Conventional textile fabric which is designed to be waterproof often tends to be uncomfortable to the user, because moisture given off by the body is generally retained within the interior space defined by the textile fabric and thus remains adjacent the user's body. This represents a particular problem to those users who are active while in a moist or wet environment and in those environments which are warm as well as wet, since the incidence of user perspiration therefore is increased.

Retained moisture is particularly problematic in textile fabrics worn as garments. For example, military personnel, sportsmen and athletes often find the discomfort due to perspiration trapped within their garments to be particularly acute. Therefore, garments are often provided with vents in locations on the garment where it is perceived to be less critical that full waterproofness be provided. For example, vents are often provided underneath the arms of garments (i.e. in the armpit region) or beneath flaps provided in the garment. As will be readily recognized, however, such vents only enable moisture to escape from localized areas within the garment, and the passage is still often inadequate to insure complete wearer dryness and comfort. Furthermore, the provision of such vents requires specially-configured garments which can be more expensive to produce, and the integrity of the waterproofness of the garment can be diminished due to the vent openings.

It is now recognized that, rather than utilizing air vents, merely transporting the water vapor contained in perspiration away from the user provides adequate comfort. A textile fabric's ability to transport water vapor through its thickness is commonly referred to as its "breathability." Although generally more comfortable, breathable materials often provide unacceptable levels of waterproofness, as the ability of a textile fabric to prevent the passage through of liquid water generally tends to be inversely proportional to the high moisture vapor transmission rate characteristic of breathable fabrics.

However, textile fabric constructions have been developed which attempt this difficult balance between breathability and waterproof properties. In general, these constructions are laminates incorporating a polymeric film, also referred to as a membrane. The primary purpose of the film layer is to repel liquid water without sacrifice to breathability. Two types of waterproof breathable films are currently available: solution-diffusion films and porous diffusion films.

Solution-diffusion films are extremely hydrophilic films which "solubilize" water vapor within their molecular chains. These films transport individual water molecules through their thickness by molecular diffusion. Solution-diffusion films are nonporous, thus providing the additional benefit of air-impermeability, or "windproofness." Although breathable and waterproof, the hydrophilic nature of solution-diffusion films cause them to swell and weaken significantly when in prolonged contact with liquid water. Therefore, solution-diffusion films usually exhibit poor durability. The problems encountered in the use of solution-diffusion films are discussed extensively in U.S. Pat. No. 5,660,198.

In contrast, porous diffusion films, commonly referred to as microporous films, are hydrophobic in nature. Porous diffusion films are generally characterized by a network of interconnecting pores which span the thickness of the film. These pores are too small to allow liquid water to pass, but are large enough to permit water vapor to readily flow through. Expanded polytetraflouroethylene film ("e-PTFE") is a particularly widely known example of such a microporous film. Unfortunately, although microporous films do retain their physical integrity over time, they too lack durability for another reason. Porous diffusion films are adversely affected by exposure to surface active agents present during wear or laundering. For example, surface active agents present in perspiration, such as body oils, salts, and the like, penetrate the microporous membrane over time, coating its pores and causing it to lose its waterproof characteristics.

Coatings have been used to protect the pores of microporous films, in particular e-PTFE films. These coatings are applied to the microporous membrane as either a continuous layer of a liquid solution or a molten application. Although providing protection, coatings penetrate the surface of the microporous film and stiffen the resulting laminate. Several coated microporous membranes are marketed by W. L. Gore and Associates, Inc., under the tradename GORETEX. Examples of coated e-PTFE fabrics are described in U.S. Pat. Nos. 4,194,041 to Gore et al. and 5,026,591 to Henn et al, the disclosures of which are incorporated herein by reference. It is also generally known to bond e-PTFE membranes to a thick, protective film using an adhesive; however, the use of thick protective films likewise increases the stiffness of the resulting laminate. Increasing the stiffness adversely affects the drape, i.e., the feel and flexibility in all directions, of the resulting fabric.

Further, the manner in which the layers comprising the waterproof breathable laminate are joined also affects the performance of the resulting fabric structure. In particular, the layers within the laminate must be cohesive, i.e. move in unison upon flexing. This unitary flexing is especially important in fabrics subjected to pressure testing, such as fabrics for use in military applications. In particular, it is important that the laminate layers act in unison in fabrics subjected to hydrostatic testing.

To provide a cohesive laminate, it is known to use adhesives, in particular nonbreathable adhesives, to bond the layers together. However, by definition, nonbreathable adhesives, although highly durable, detract from the overall performance of the product by lowering the moisture vapor transmission rate of the resulting laminate. The use of such nonbreathable adhesives in conjunction with hydrophilic films is taught in U.S. Pat. Nos. 5,660,918 and 4,761,324.

Breathable adhesives are available for use in waterproof fabric laminates. However, caution must be taken in their use, as well. Breathable adhesives are hydrophilic in nature. Similar to solution-diffusion films, breathable adhesives lack durability due to their tendency to swell with water and subsequently weaken over time. This issue is especially problematic when bonding stretch resistant materials, which do not yield, or give, when the adhesive swells. The use of breathable adhesives presents particular difficulties in those applications involving launderability standards. Further, as with any coating, the use of excessive amounts of adhesive, breathable or otherwise, results in a stiffer fabric laminate.

As indicated above, a wide variety of competing factors affect the overall performance of waterproof, breathable laminates, requiring a difficult balance to be struck to provide an optimal fabric structure. There remains a need for a fabric construction having a high degree of breathability and waterproofness, which resists contamination during wear, cleaning, laundering, and restoration processes, which is durable and possesses superior drape. Furthermore, a need exists for a process for making such a material in an efficient and cost effective manner.

SUMMARY OF THE INVENTION

The present invention combines the advantages of solution-diffusion films, porous diffusion films, durable adhesives, and breathable adhesives to create a unique textile laminate for use in outdoor garments and other textile applications. The textile laminates of the present invention exhibit many advantageous properties. For example, the textile laminates of the present invention are extremely breathable, have superior waterproof properties, have excellent drape, are soft to the touch, and are quiet. The present invention further provides a method by which to produce the breathable waterproof textile laminate of the present invention.

More particularly, the present invention provides a breathable waterproof textile laminate containing a minimum of two layers formed by adhering a microporous membrane to a nonporous layer capable of diffusing water vapor through its thickness. In one advantageous embodiment, a face layer is further adhered to the microporous membrane component, thus providing a three layer laminate. Both durable, i.e. nonhydrophilic, and breathable, i.e. hydrophilic, adhesives are used within the construction to impart cohesion to the laminate structure. In another aspect of this advantageous embodiment, a backing layer is further adhered to the nonporous layer component, using either a breathable hydrophilic adhesive or a durable nonhydrophilic adhesive, thus forming a four layer laminate. In an alternative embodiment, a three layer laminate comprised of a backing layer adhered to the nonporous film component in a nonporous film/microporous membrane laminate is provided.

In one advantageous embodiment, the face layer is a durable woven nylon fabric, preferably having a fabric weight ranging from about 1 to about 10 ounces/yd$^2$. Exemplary microporous membranes for use in the present invention include expanded polytetraflouroethylene and similar films. Expanded polytetraflouroethylene (e-PTFE) is employed in a particularly advantageous embodiment of the present invention. The e-PTFE may be further characterized as having an air permeability of from about 0.5 to about 7.0 ft$^3$/min, and is preferably from about 25 to about 75 microns thick. In one advantageous embodiment, the nonporous layer has a moisture vapor transmission rate of from about 3000 to about 5000 gm/m$^2$/24hr. In a further aspect of the invention, the nonporous layer has a thickness of from about 5 to about 25 microns. In a preferred embodiment, the nonporous layer is a nonporous film. Exemplary nonporous films include polyether polyurethane.

The layers are adhered using a combination of breathable hydrophilic adhesives and durable nonhydrophilic adhesives. Exemplary breathable hydrophilic adhesives include polyether polyurethane. In one advantageous embodiment, polyether polyurethane is employed to adhere the microporous membrane to the nonporous layer. In a further embodiment, a breathable hydrophilic adhesive is used to bond the nonporous layer to the backing layer.

The durable nonhydrophilic adhesive may also be a variety of materials, including crosslinkable polyester polyurethane. In a preferred embodiment, crosslinkable polyester polyurethane is employed to bond the face layer to the microporous membrane, particularly in those embodiments in which the face layer is comprised of a stretch resistant construction.

The adhesives of the present invention are generally applied in a discontinuous pattern. In one advantageous aspect of the present invention, adhesive covers from about 40 to about 50% of the bonding surface between the face layer and the microporous membrane, applied in an amount ranging from about 0.25 to 0.35 oz/yd$^2$. In a further advantageous aspect, the adhesive applied between the microporous membrane and the nonporous layer, as well as that applied between the nonporous layer and the backing layer, covers about 40% to about 50% of the respective bonding surfaces, and is applied in an amount ranging from about 0.25 to 0.35 oz/yd$^2$.

In further embodiments, methods to form the novel laminates of the present invention are provided. These methods include advancing a pair of layers adjacent to each other and adhering them. In further aspects of the invention, the adhesion process comprises applying the adhesive using gravure coating. The layers may be further dried and/or cured as part of the adhesion process.

The present invention provides a waterproof, breathable fabric laminate having superior durability and drape by combining the advantages of several materials. In particular, the durable fabric of the present invention is able to withstand the rigors of use, cleaning, laundering, and restoration. In addition, the present invention provides a soft fabric, which is quiet. The present invention provides the foregoing benefits by utilizing a combination of waterproof, breathable materials in conjunction with a combination of adhesives to provide superior overall performance.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout.

A laminated fabric is provided having a plurality of sequentially-combined layers which in combination achieve a fabric having a high degree of breathability and waterproofness, which further retains its breathability and waterproofness throughout use, cleaning, laundering, and restoration, and which also provides adequate drape and softness.

Figure 1A:
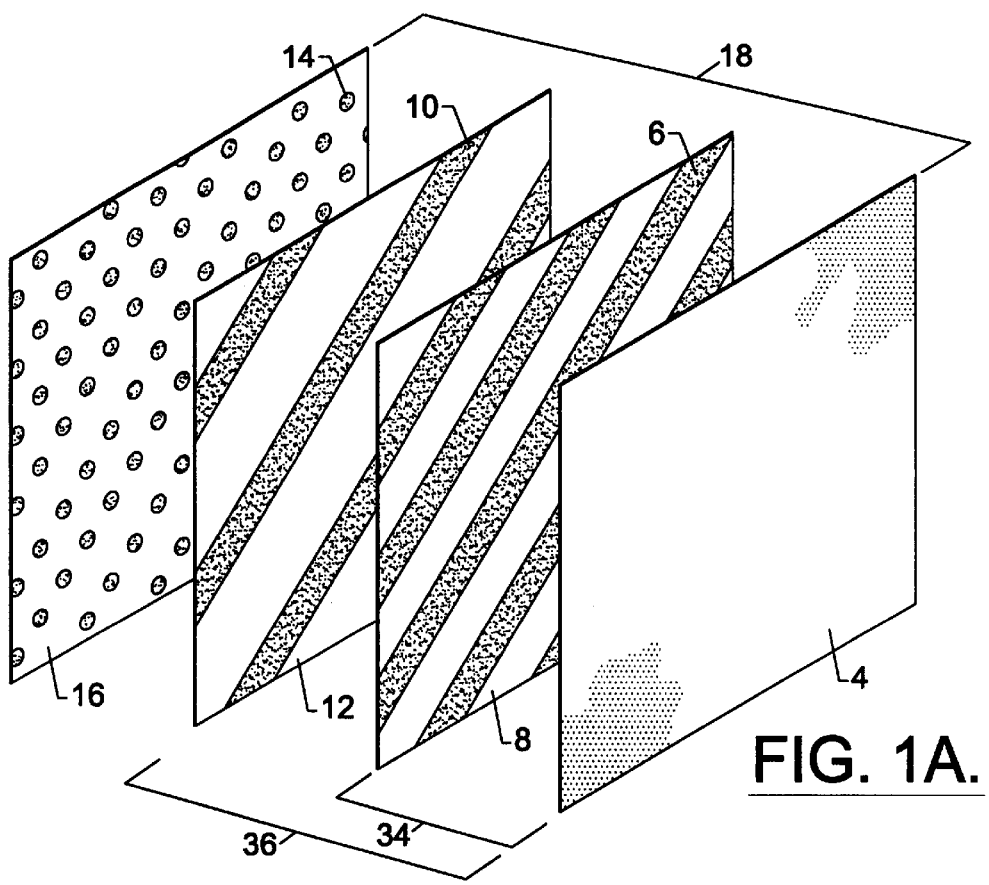
FIG. 1A is a diagrammatic exploded view of one advantageous embodiment of the present invention.
Figure 1B:
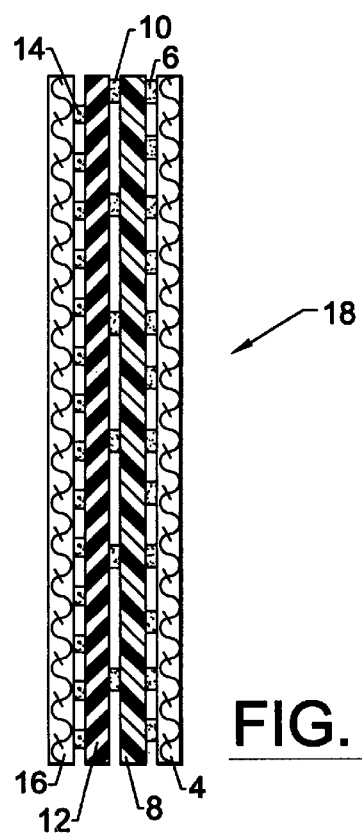
FIG. 1B is a greatly enlarged cross-sectional view of the advantageous embodiment provided in FIG. 1A.

The process to produce the laminated fabric of the present invention involves the sequential application of layers. In one advantageous embodiment, a four layer construction such as that shown in FIGS. 1A and 1B is provided. In that embodiment, a face layer 4 is secured to a microporous membrane 8 to form a combined structure, thus providing the intermediate laminate 34.

The face layer 4, comprised of a fabric which is positioned furthest from the user or wearer, is exposed to the environment. Therefore, in general, the face layer 4 is a heavy, durable fabric, preferably chosen to withstand conditions encountered in rough terrain. In one advantageous embodiment, the face fabric is a stretch resistant material. The face fabric is desirably selected from those having a weight range of about 1 to about 10 oz/sq.yd, and can have any desired fiber composition (e.g. synthetic or natural or blends thereof) or construction (woven, knit, nonwoven, and the like). For example, fabrics of woven nylon have been found to perform well in the instant invention. In one advantageous embodiment, a 6 oz/yd$^2$ woven TASLAN nylon fabric is employed. In addition, the face layer 4 may be dyed or printed prior to securing it to the microporous membrane 8, as is known in the art.

The microporous membrane 8 utilized in the present invention is hydrophobic in nature and further characterized by a multiplicity of open, interconnecting voids. In general, the microporous membrane also provides strength to the laminate, and has stable chemical properties. The microporous membrane 8 is further selected from those having an air permeability on the order of about 0.50–7 cfm (cubic feet per minute), a thickness of about 10–80 microns, and pore sizes ranging from 0.25–10.0 microns. Membrane weights from 0.20 to 1.5 oz/yd$^2$ are useful, with 0.50 to 0.75 oz/yd$^2$ preferred. Known hydrophobic microporous membranes include e-PTFE. In one advantageous embodiment, the microporous membrane 8 is e-PTFE. In a further aspect of that advantageous embodiment, e-PTFE film having a thickness of 2 mils (51 microns) is employed. The methods by which such e-PTFE membranes are formed are provided in U.S. Pat. Nos. 3,953,566 and 4,187,390.

A durable adhesive 6 is generally used to secure the microporous membrane 8 to the face layer 4. Durable adhesives are defined herein as those which do not transmit an appreciable amount of moisture vapor, i.e. they are nonhydrophilic, and are thus nonbreathable. The durable nonhydrophilic adhesive 6 is selected to provide good adhesion between the two layers. Exemplary durable nonhydrophilic adhesives include cross-linked polyester polyurethanes. In one advantageous embodiment, a cross-linked polyester polyurethane adhesive, such as the variety distributed by Polyurethane Specialties, Inc. of Lundhurst, N.J. is employed, although such cross-linked polyester polyurethanes are available from other suppliers as well. In particular, Adhesive 490 from Polyurethane Specialties has been found to be beneficial in the present invention.

Figure 2:
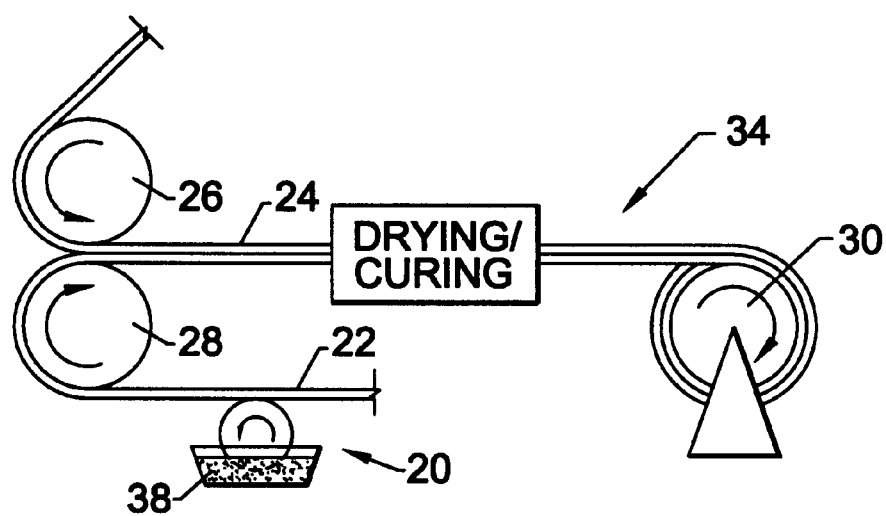
FIG. 2 is a schematic view of a laminating process associated with several of the aspects of the present invention.

Referring now to FIG. 2, a laminating process, such as the process employed to bond the face layer, shown in FIG. 2 as 24, to the microporous membrane, shown in FIG. 2 as 22, is provided. The durable nonhydrophilic adhesive, shown in FIG. 2 as 38, is applied to the microporous membrane in a discontinuous pattern. As used herein, the term "discontinuous" means that the adhesive does not completely cover the bonding surface. In the particularly advantageous embodiment of FIG. 2, the durable adhesive is applied by direct gravure coating 20. It is well known to use engraved gravure rolls to deposit a range of discontinuous coating patterns on a substrate. Typical discontinuous adhesive patterns include slanted (also referred to as "helical")) lines, dots, and cross hatch. In a preferred embodiment of the present invention, the gravure roll applies a discontinuous pattern of adhesive in a series of solid helical lines, such as depicted in FIG. 1. The adhesive is desirably applied at a rate of coverage of about 40–50%, preferably about 40%, in weights ranging about 0.25 to about 0.35 oz/yd$^2$, preferably about 0.3 oz/yd$^2$.

The coated microporous membrane 22 is then combined with the face layer 24 using heat and/or pressure, such as that supplied by rolls 26 and 28. The coated structure is subjected to a drying/curing process, as is known in the art. In this process, the adhesive is initially dried by evaporation and then further cured or cross-linked through the adjustment of temperature and/or passage of time. In one advantageous embodiment, the drying/curing process is accomplished using a single oven. In such a single oven embodiment, typical dry/cure conditions involve subjecting the coated substrate to hot air between about 150 to about 250° F., with a dwell time between about 10 to about 60 seconds. Following the dry/cure process, the intermediate laminate is collected on a take-up roll 30.

Returning now to FIG. 1A, the microporous membrane 8 is laminated to a nonporous layer 12, thus forming the laminate 36. The nonporous layer 12 is water vapor permeable and extremely hydrophilic. The nonporous layer 12 is further desirably selected to have a thickness on the order of about 5–15 microns, and a moisture vapor transmission rate (as tested according to ASTM E-96, Proc. B) of about 3000–5000 gm/m$^2$/24hr. The water vapor permeable nonporous layer 12 is generally a film, preferably chosen from films formed from polymers such as polyurethane. In one particularly advantageous embodiment, an extruded nonporous hydrophilic thermoplastic polyurethane (TPUR) film is employed.

One particular TPUR film which has been found to perform well in the instant invention is Transport TX 1540 sold by Omniflex Flexible Films & Composites of Greenfield, Mass., although such TPUR films are available from other suppliers, as well. Transport TX 1540 is a thermoplastic polyurethane extruded film (as opposed to a blown film) which has very high moisture vapor transmission properties. In particular, the moisture vapor transmission of Transport TX 1540 is 3000–5000 gm/m$^2$/24h based on ASTM Test B-96, procedure B.

Transport TX 1540 is extruded onto a 2 mil polyethylene (PE) carrier film to provide support to the TPUR during processing. Because Transport TX 1540 is produced by casting onto a carrier film, it enables production of a TPUR film without use of materials, such as fillers and lubricants, that can result in later surface contamination.

Further, Transport TX 1540, a polyether polyurethane, is known to have the following properties: a specific gravity of about 1.2 g/cc using ASTM D-792, a Shore hardness measured using ASTM D-2240 of about 80A, a tensile strength of about 4000–5000 psi using ASTM D-412, an elongation of about 600–700% using ASTM-412, a modulus at 100% of about 550–650 psi using ASTM D-412, and a tensile set at 200% using ASTM D-412 (at 200% elongation) of less than 40%.

The nonporous layer 12 is bonded to the microporous membrane 8 using a breathable adhesive 10. The term "breathable adhesive" as used herein refers to a hydrophilic adhesive. The breathable hydrophilic adhesive is selected to provide high water vapor transmission, as well as good adhesion between the layers. Exemplary breathable adhesives include polyether polyurethane. In particular, moisture cured polyether polyurethane adhesives have been found to perform well in the invention. In one advantageous embodiment, 51379 Clear Comfortex Basecoat sold by Raffi & Sons Inc. of Wilmington, Mass. is applied, although such moisture cured polyether polyurethane adhesives are available from other suppliers, as well.

Figure 3:
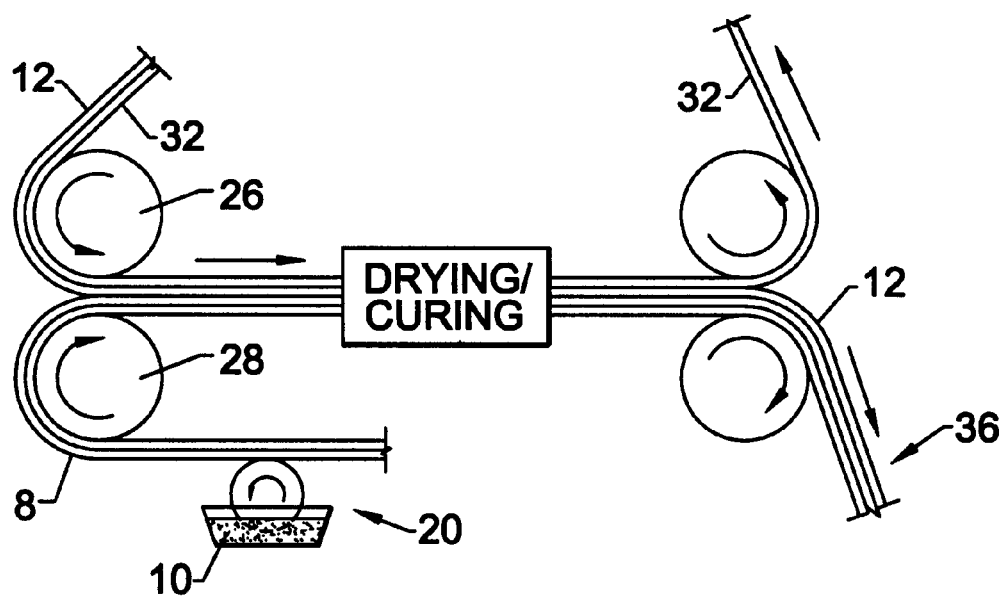
FIG. 3 is a schematic view of the laminating process associated with an aspect of the present invention.

Referring now to FIG. 3, a process is provided for laminating a nonporous layer 12 cast onto a carrier film 32, e.g. Transport TX 1540, with a microporous membrane 8. The breathable hydrophilic adhesive 10 is applied to the microporous membrane 8 in a discontinuous pattern. In the advantageous embodiment provided in FIG. 3, the breathable hydrophilic adhesive is applied by direct gravure coating 20. Although several discontinuous patterns may be acceptable, in a preferred embodiment the gravure roll applies a discontinuous pattern of breathable hydrophilic adhesive 10 in a series of solid helical lines, as indicated in FIG. 1A. The adhesive is desirably applied at a weight of about 0.25–0.35 oz/yd$^2$, preferably 0.30 oz/yd$^2$, and a coverage of about 40–50%, preferably 40%. In one advantageous embodiment, the adhesive is applied as a 40 weight percent solution in a mixture of solvents, such as a mixture of methyl ethyl ketone and toluene.

As shown in FIG. 3, the coated microporous membrane 8 is combined with the nonporous layer 12 using heat and/or pressure, such as that supplied by rolls 26 and 28. It is important that the tension of the various layers match when bonding nonporous layers which are elastomeric, to avoid imparting curl to the finished laminate.

Following contact, the coated structure is subjected to a drying/curing process, as is known in the art. In this process, the adhesive is desirably dried by evaporating solvents therefrom and the dried coating is subsequently cured or cross-linked through the adjustment of temperature and/or lapse of time. In one advantageous embodiment, the drying/curing process is accomplished using a single oven. In such a single oven embodiment, typical dry/cure conditions involve subjecting the coated substrate to hot air between about 150 to about 250° F., with a dwell time between about 10 to about 60 seconds. In those embodiments in which the water permeable nonporous film is supplied on a carrier film 32, the carrier film 32 is removed from the laminate construction following the drying/curing process.

Returning now to the advantageous embodiment provided in FIG. 1A, the nonporous layer 12 is bonded to a backing layer 16, thus forming the laminate 18. The backing layer 16, placed adjacent to the user or wearer, is a typically a light weight fabric, chosen primarily for comfort. The backing fabric may be formed from nylon or polyester having a weight ranging from about 0.5 oz/sq.yd to about 4 oz/sq.yd. In one advantageous embodiment, the backing layer 16 is desirably a tricot knit nylon fabric.

The backing layer 16 is primarily intended to protect the nonporous layer 12 from abrasion and the like. Therefore, the backing layer 16 is generally recommended in those embodiments in which the waterproof breathable laminate is intended for direct contact with the user or wearer. Such an embodiment is illustrated as 18. Alternative embodiments employing a separately hung lining do not require the backing layer 16. In these embodiments, the laminate shown as 36 is instead incorporated into the garment or other article. In an alternative aspect of the present invention, the face layer 4 is not required. In this embodiment a three layer laminate comprised of a backing layer 16, a nonporous layer 12 and a microporous membrane 8 is incorporated directly into the garment or other article. In such an embodiment, the backing layer is adhered to a nonporous layer bonded to a microporous membrane. Three layer constructions containing a backing layer are incorporated into garments and other articles having a separately hung face fabric.

In those embodiments forming the laminate 18, the nonporous film 12 is typically bonded to the backing layer 16 using a breathable hydrophilic adhesive 14, such as the breathable hydrophilic adhesive 10 used to combine the nonporous layer 12 to the microporous membrane 8. The breathable hydrophilic adhesive is selected to provide high water transmission values, as well as good adhesion between the layers. Exemplary breathable hydrophilic adhesives include polyether polyurethane. In particular, moisture-cured polyether polyurethane adhesives, such as the type sold by Raffi & Swanson, Inc. of Wilmington, Mass. under the tradename 51379 Clear Comfortex Basecoat, have been found to perform well in the invention, although such adhesives are available from other suppliers as well.

The breathable hydrophilic adhesive 14 is applied to the backing layer 16 in a discontinuous pattern, as illustrated in FIG. 1A, such as by direct gravure coating on the backing layer. Although other discontinuous patterns may be acceptable, in a particularly advantageous embodiment the gravure roll applies a discontinuous pattern of adhesive in the form of a series of dotted helical lines. The adhesive is desirably applied at a weight of about 0.25–0.35 oz/yd$^2$, preferably 0.30 oz/yd$^2$, and a coverage of about 40–50%, preferably 40%. In a preferred form of the invention, the breathable adhesive is supplied as a 40 weight percent solution in a solvent, such as a mixture of methyl ethyl ketone and toluene.

The coated backing fabric is then combined with the nonporous film in a process similar to that illustrated in FIG. 2 (but with the various layers interchanged). The nonporous film is provided to this step in the form of an intermediate laminate structure, shown in FIG. 1A as 36. The layers are combined using heat and/or pressure, such as that applied by rolls. The coated laminate structure is subjected to a drying/curing process following contact, as is known in the art. The adhesive is dried by evaporation and further cured or cross-linked through the adjustment of temperature and/or passage of time. In one advantageous embodiment, the drying/curing process is accomplished using a single oven. In such a single oven embodiment, typical dry/cure conditions involve subjecting the coated substrate to hot air between about 150 to about 250° F., with a dwell time between about 10 to about 60 seconds. Following the drying/curing process, the four layer laminate is collected on a take-up roll.

The laminate shown in FIG. 1A as 18 and produced according to the instant invention has a high moisture vapor transmission rate, as well as a good level of hydrostatic resistance. A sample of the laminate fabric 18 was produced according to the instant invention for testing. Initially, an intermediate laminate was formed by bonding a 6 oz/yd$^2$ woven TASLAN nylon face fabric to a 2 mil thick e-PTFE membrane with an air permeability of between about 0.5 to about 7.0 cfm using Adhesive 490 from Polyurethane Specialties, a nonhydrophilic crosslinkable polyester polyurethane. The Adhesive 490 was applied by direct gravure at a weight of about 0.3 oz/yd$^2$ and about 40% coverage. The e-PTFE was bonded in turn to a Transport TX 1540 water permeable polyurethane film having a thickness of about 0.0003" (i.e. about 7 microns) using Comfortex 51379 polyether polyurethane. The Comfortex 51379 was likewise applied by direct gravure at a weight of about 0.3 oz/yd$^2$ and about 40% coverage. The Transport TX 1540 was subsequently adhered to a 1.2 oz/yd$^2$ nylon knit fabric, also using Comfortex 51379 polyether polyurethane. The Comfortex 51379 was applied by direct gravure at a weight of 0.3 oz/yd$^2$ and a 40% coverage.

This sample was tested according to ASTM E-96 Procedure BW and found to have a moisture vapor transmission rate of about 3600–6300 gm/sq.m/24hr, with a typical value of about 5000 gm/sq.m/24hr. These values correlate to a minimum of 600 gm/sq.m/24hr, typically 750 gm/sq.m/24hr, using ASTM E-96, Procedure B.

The laminate retained its performance over time, yielding a moisture vapor transmission rate of about 5900–6400 gm/sq.m/24h after 5 washes, similarly based on ASTM E-96 Procedure BW. Therefore, it was apparent that the laminates avoided the decrease in performance commonly experienced in prior art materials as a result of contamination from surfactants and the like. In addition, these samples were tested according to foreign country test methods and found to retain high moisture vapor transmission rates following repeated washings.

The laminate was also tested using ASTM D-3393, and found to have a hydrostatic resistance of greater than 40 psi, typically around 85 psi. The hydrostatic resistance was determined using ASTM Test Method 5512 (Fed. Std. 191). Further, the laminate exhibited a minimum resistance to leakage of 50 cm of water pressure for a duration of 5 min, typically 300 cm of water pressure for a duration of 5 min, determined using ASTM Test Method 3316 (Fed. Std. 191). In addition to these performance characteristics, the laminate is soft, quiet (which can be important in many military and sportsmen's applications), comfortable, and lightweight.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended. Although specific terms are employed herein, they are used in a generic and descriptive sense only and not for purposes of limitation.

That which is claimed:

1. A breathable and waterproof textile laminate, said laminate comprising:

a microporous membrane comprising a hydrophobic film having a plurality of pores of a size large enough to allow water vapor to pass therethrough but small enough to resist the passage of liquid water;

a nonporous layer bonded to said microporous membrane with a first adhesive to protect the microporous membrane from contaminants, said nonporous layer comprising a hydrophilic material capable of allowing the diffusion of water vapor therethrough; and a fabric layer adhered to one of the microporous membrane and the nonporous layer with a second adhesive;

wherein one of the first and second adhesives comprises a hydrophilic adhesive and the other comprises a non-breathable discontinuous nonhydrophilic adhesive.

2. A breathable and waterproof textile laminate according to claim 1, wherein the fabric layer is adhered to the microporous membrane.

3. A breathable and waterproof textile laminate according to claim 2, wherein said fabric layer comprises a stretch resistant construction bonded to said microporous membrane using said nonhydrophilic adhesive.

4. A breathable and waterproof textile laminate according to claim 3, wherein said nonhydrophilic adhesive bonding said fabric layer to said microporous membrane covers from about 40 to about 50% of the bonding surface therebetween.

5. A breathable and waterproof textile laminate according to claim 1, wherein the fabric layer is adhered to the nonporous layer to be adjacent to a user.

6. A breathable and waterproof textile laminate according to claim 5, wherein said adhesive bonding said fabric layer to said nonporous layer comprises a hydrophilic adhesive.

7. A breathable and waterproof textile laminate according to claim 6, wherein said adhesive bonding said fabric layer to said nonporous layer covers from about 40 to about 50% of the bonding surface therebetween.

8. A breathable and waterproof textile laminate according to claim 1, further comprising a second fabric layer adhered opposite the first fabric layer to the other of the microporous membrane and the nonporous layer with an adhesive comprising one of a hydrophilic adhesive and a nonhydrophilic adhesive.

9. A breathable and waterproof textile laminate according to claim 8, wherein the first fabric layer is adhered to the microporous membrane and the second fabric layer is adhered to the nonporous layer to be adjacent to a user.

10. A breathable and waterproof textile laminate according to claim 1, wherein said microporous membrane is bonded to said nonporous layer using said hydrophilic adhesive.

11. A breathable and waterproof textile laminate according to claim 10, wherein said hydrophilic adhesive bonding said microporous membrane to said nonporous layer covers from about 40 to about 50% of the bonding surface therebetween.

12. A breathable and waterproof textile laminate according to claim 1, wherein said microporous membrane is expanded polytetrafluoroethylene.

13. A breathable and waterproof textile laminate according to claim 12, wherein said expanded polytetrafluoroethylene has an air permeability of from about 0.5 to about 7.0 ft$^3$/min.

14. A breathable and waterproof textile laminate according to claim 12, wherein said expanded polytetrafluoroethylene has a thickness from about 25 microns to about 75 microns.

15. A breathable and waterproof textile laminate according to claim 1, wherein said nonporous layer has a moisture vapor transmission rate of from about 3000 to about 5000 gm/m$^2$/24hr.

16. A breathable and waterproof textile laminate according to claim 15, wherein said nonporous layer has a thickness of from about 5 to about 25 microns.

17. A breathable and waterproof textile laminate according to claim 15, wherein said nonporous layer is polyether polyurethane.

18. A breathable and waterproof textile laminate according to claim 1, wherein said nonhydrophilic adhesive is crosslinked polyester polyurethane.

19. A breathable and waterproof textile laminate according to claim 1, wherein said hydrophilic adhesive is polyether polyurethane.

20. A breathable and waterproof textile laminate, said laminate comprising:

a face layer formed of a fabric;

a microporous membrane comprising a hydrophobic film having a plurality of pores of a size large enough to allow water vapor to pass therethrough but small enough to resist the passage of liquid water, said microporous membrane being bonded to said face layer with a first adhesive;

a nonporous layer bonded to said microporous membrane with a second adhesive to protect the microporous membrane from contaminants, said nonporous layer comprising a hydrophilic material capable of allowing the diffusion of water vapor therethrough; and a backing layer formed of a fabric which is bonded to said nonporous layer with a third adhesive;

wherein the first, second and third adhesives may be either a hydrophilic or nonhydrophilic adhesive and at least one of the first, second, and third adhesives comprises a hydrophilic adhesive and at least one of the others comprises a nonbreathable discontinuous nonhydropilic adhesive.

21. A breathable and waterproof textile laminate according to claim 20, wherein said backing layer is a knit fabric formed from nylon.

22. A breathable and waterproof textile laminate according to claim 20, wherein said face layer comprises a stretch resistant construction and is bonded to said microporous membrane using said nonhydrophilic adhesive.

23. A breathable and waterproof textile laminate according to claim 20, wherein said microporous membrane is bonded to said nonporous layer using said hydrophilic adhesive.

24. A breathable and waterproof textile laminate according to claim 20, wherein said nonporous layer is polyether polyurethane.

25. A breathable and waterproof textile laminate according to claim 20, wherein said hydrophilic adhesive is polyether polyurethane.

26. A breathable and waterproof textile laminate according to claim 20, wherein said nonhydrophilic adhesive is crosslinked polyester polyurethane.

* * * * *

UNITED STATES PATENT AND TRADEMARK OFFICE
CERTIFICATE OF CORRECTION

PATENT NO.    : 6,511,927 B1
DATED         : January 28, 2003
INVENTOR(S)   : Ellis et al.

It is certified that error appears in the above-identified patent and that said Letters Patent is hereby corrected as shown below:

Title page,
Item [56], References Cited, U.S. PATENT DOCUMENTS, "6,075,738" should read -- 6,074,738 --.

Column 10,
Line 14, after "breathable" insert a comma -- , --.

Column 12,
Line 5, after "nonbreathable" insert a comma -- , --.

Signed and Sealed this

Twenty-fourth Day of June, 2003

JAMES E. ROGAN
*Director of the United States Patent and Trademark Office*